United States Patent Office 3,038,562
Patented June 12, 1962

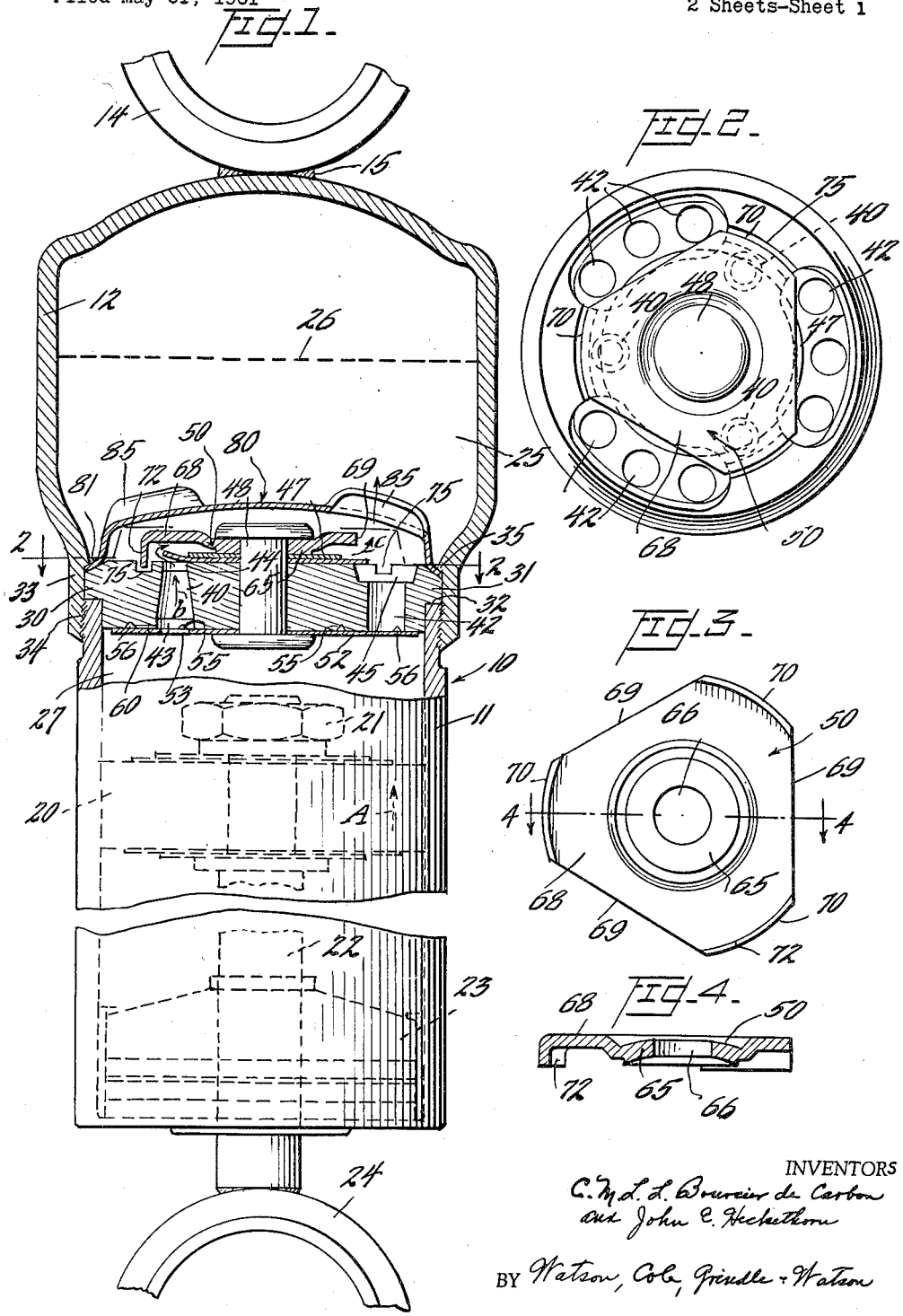

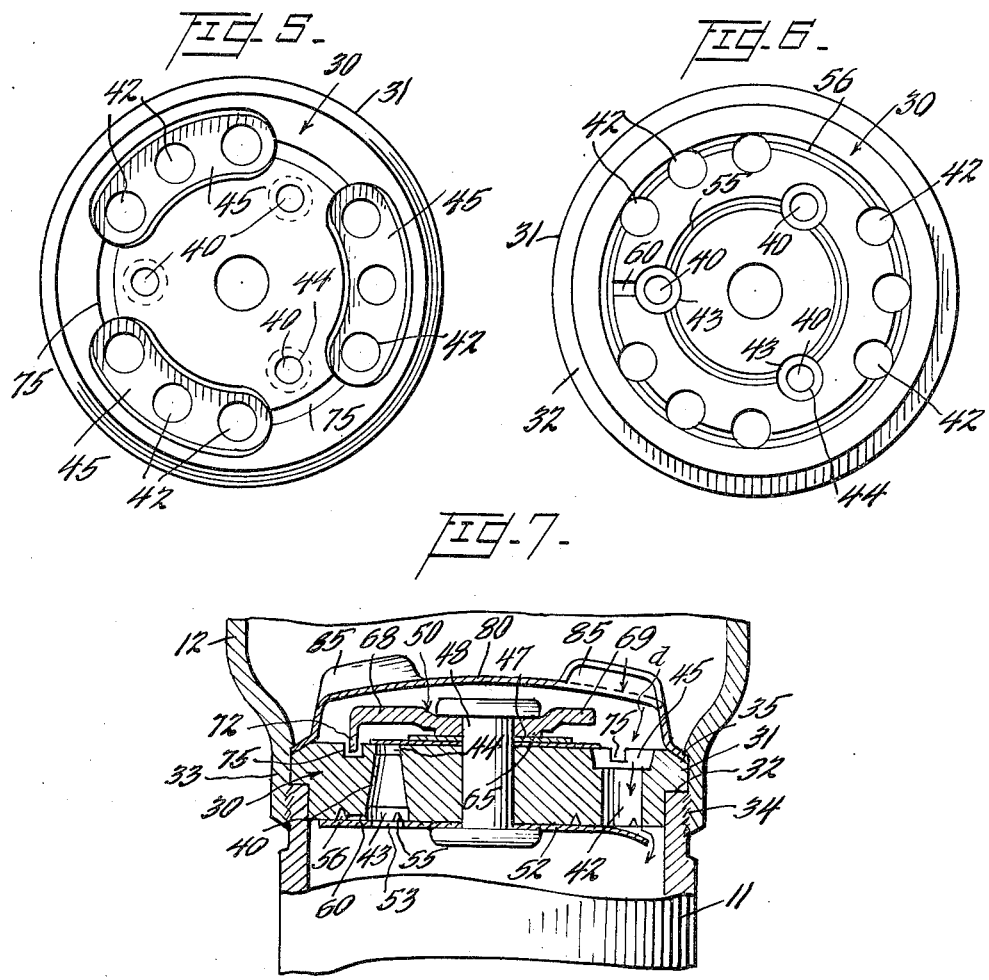

3,038,562
SHOCK ABSORBERS
Christian Marie Lucien Louis Bourcier de Carbon, 64 Blvd. Maurice-Barres, Neuilly-sur-Seine, France, and John E. Heckethorn, Dyersburg, Tenn., assignors, by direct and mesne assignments, to said Christian Marie Lucien Louis Bourcier de Carbon
Filed May 31, 1961, Ser. No. 113,776
9 Claims. (Cl. 188—100)

This invention relates to shock absorbers and more particularly to hydraulic double-acting shock absorbers of the piston-and-cylinder type particularly adapted for damping the relative movements of the chassis and the wheel suspensions of automotive vehicles, and has to do specifically with the piston rod displacement fluid valving of such shock absorbers.

The general objects and purposes of the present invention are similar to those of our co-pending application Ser. No. 68,003, filed November 8, 1960, but the present particular concept presents certain advantages and features of novelty which make for improved construction and operation.

Among such improved features may be mentioned the more pronounced 120° spacing of the fluid passageways and orifices through the partition between the working chamber of the shock absorber cylinder and the piston rod displacement fluid chamber or reservoir, thus improving the progressive cylindrical deflection of the return valve. Also, the grouping of the return orifices closer together renders it easy to standardize the dimensions of certain of the parts such as the inlet and return valve discs, the connecting rivet, and the primary baffle (and also the secondary baffle if blanked to a smaller outside diameter) for interchangeability between shock absorbers of different piston rod and cylinder diameters.

Also, the discharge jet of displaced damping liquid is prevented from escaping under the primary baffle, the latter element now having its peripheral lip or flange extended downwardly into a groove formed in the face of the partition plate. In prior constructions, the inlet valve thickness could not be varied without incurring leakage beneath the primary baffle lip.

Perhaps the most distinctive feature of the present invention is the triangulation of the primary baffle. This means that the normally circular baffle element has segments cut away along chordal lines spaced 120° apart, leaving relatively short arcuate portions which serve to baffle the jets of liquid entering the rod displacement chamber or reservoir during the entrance of the piston rod. One direct effect of this provision is the relieving of the periphery of the baffle at points spaced above the intake orifices of the return flow passageways. In previous constructions the inlet fluid escaping under the primary baffle at such points had a tendency to scoop liquid out of the intake portions of the return orifices. With the present arrangement the liquid escapes through much larger openings from the segmentally cutaway portions of the primary baffle and this high volume low velocity flow moves across the outer surface of the partition plate without agitating the liquid within the return orifices.

Higher piston velocities can be reached in this novel construction without aeration. Velocities higher than fifty-five inches per second can now be run indefinitely without aeration of the damping liquid. Since the highest velocity ordinarily reached in normal operation rarely exceeds thirty inches per second, this arrangement provides completely adequate resistance to aeration for travel of a vehicle equipped with these shock absorbers on washboard roads and other rough terrain. Also, in the earlier arrangement, the primary baffle was found to interfere to some extent with the return flow of the damping liquid.

The present novel triangulated primary baffle, especially when coupled with the kidney-shaped return orifice arrangement, provides minimum resistance to return flow of fluid and this is to a great degree responsible for the higher velocities which can be reached without aeration of the liquid.

Other objects and features of novelty, including the provision of an additional annular channel on the inner face of the partition, will be apparent from the following specification when read in connection with the accompanying drawings in which one embodiment of the invention is illustrated by way of example.

In the drawings:

FIGURE 1 is a view partly in elevation and partly in vertical diametric section of a shock absorber embodying the principles of the invention, the parts being shown as they would appear during a compression stroke of the piston;

FIGURE 2 is a horizontal sectional view taken through the casing of the shock absorber, beneath the secondary baffle, and showing in plan view the outer end construction of the partition plate and associated rod displacement index valving, including the novel primary baffle element;

FIGURE 3 is a plan view of the primary baffle;

FIGURE 4 is a vertical sectional view taken on line 4—4 of FIGURE 3;

FIGURE 5 is a plan view of the outward end face of the piston rod displacement chamber or reservoir partition;

FIGURE 6 is a plan view of the inner face of that partition; and

FIGURE 7 is a fragmentary sectional view of the shock absorber including the partition and associated valving indicating the flow of fluid during the return or rebound stroke of the piston rod.

A shock absorber embodying the principles of the invention is indicated generally by the reference numeral 10 in FIGURE 1 of the drawings and comprises the cylindrical casing 11 surmounted by the enlarged reservoir casing 12. A ring or eye 14, or other suitable mounting means, is welded as at 15 to the top of the casing 12, by means of which the cylinder portion of the shock absorber may be secured to one of the two members the relative movement of which is to be damped. When applied to automotive suspensions, this eye 14 is suitably secured to the chassis of the vehicle.

Disposed for longitudinal reciprocation within the cylinder 11 is the piston 20, which is provided with valved bypass passageways and may be constructed, if desired, in the same manner as the piston disclosed in our co-pending application Serial No. 68,003. Suitably secured to the piston 20 as by means of the nut 21 is the piston rod 22 which passes through the sealing installation 23 which constitutes in effect the bottom wall of the cylinder 11. Here again, the packing installation may be of the same general construction as illustrated and described in the aforesaid co-pending application and other applications and patents in the name of Bourcier de Carbon. To the lower end of the piston rod 22 is welded the ring or eye 24, or other suitable mounting means, by means of which the rod is adapted to be connected to the other of the two relatively moving members such as, for example, the wheel mounting of a vehicle.

Now, as clearly understood by those familiar with this type of shock absorber, when the two members such as the chassis and wheel mounting of an automobile are brought together as when the wheels strike a bumper or obstruction in the road, the piston 20 moves upwardly within the cylinder 11, and although the piston valving restricts and controls the flow of the damping liquid contained in the shock absorber casing, the progressive entrance of successive portions of the rod 22 into the cylinder 11 must displace damping liquid upwardly into the reservoir 25.

An approximate level of the liquid at the point of progress of the piston shown in FIGURE 1 is indicated at 26 in FIGURE 1 of the drawings.

Disposed between the working chamber 27, enclosed within the cylinder proper 11, and the reservoir 25 is the partition plate 30, this plate being shown clearly in section in FIGURES 1 and 7 and in inner and outer plan views in FIGURES 5 and 6. The plate is provided with a peripheral flange 31 which forms a shoulder 32 which surmounts the end of the cylinder 11 and is closely embraced by the downwardly extending narrowed tubular flange 33 of the dome structure 12. This flange extends further downwardly and is welded as at 34 to the exterior of the narrowed upper end portion of the cylinder 11. The downwardly extending flange of the dome 12 is provided with a shoulder 35 the purpose of which will be explained presently.

The partition plate 30 is provided with two series of passageways.

The first series, in the illustrated embodiment, comprises the three separated single passageways 40 which are spaced 120° apart around the partition plate.

The other series of passageways comprises, in the illustrated embodiment, three groups of three passageways each, these passageways being indicated at 42.

Preferably, the passageways 40 are for the most part frusto-conical in configuration and each is provided with cylindrical inlet and outlet orifices indicated at 43 and 44.

Preferably, the passageways 42 in each group open into a common inlet recess or cavity 45 which, as suggested in FIGURE 2 of the drawings, is of a kidney-shaped configuration.

The outlet or discharge orifices 44 of the passageways 40 are controlled by the disc valving 47 which may be formed of one or more flat resilient discs clamped in place by means of the axially disposed rivet member 48. Between the valve 47 and the head of the rivet 48 is clamped a combined baffle and retaining member 50 which will be described in more detail presently. The central depressed portion of the baffle 50 contacts the valving and provides a clamping means for the latter, the outer portions of the baffle being raised so as to permit the proper progressive flexing of the valving 47 under pressure of the displaced fluid. This flexure is along cylindrical lines rather than conical as described in the co-pending application of Bourcier de Carbon Serial No. 701,585, filed December 9, 1957, now Patent Number 3,003,594.

For controlling the outlet orifices of the passageways 42 a return valve disc 52 is provided, this disc being secured by the lower head of the rivet 48 to the bottom surface of the partition plate 30. The valve disc 52 flexes downwardly, returning fluid through the passageways 42, whenever a pressure drop occurs under the partition plate 30.

Openings 53 are provided in the valve disc 52 substantially registering with the inlet orifices 43 of the passageways 40, so as not to interfere with the displacement flow of the liquid through those passageways.

One novel feature of the present invention resides in the provision of a slight bypass of liquid between the displacement passageways 40 and the return passageways 42. A shallow circular groove 55 is cut in the bottom surface of the partition 30, this groove intersecting the three displacement passageways 40; and a concentric shallow circular groove 56 traverses the lower or inward surface of the partition plate outwardly of the groove 55, the groove 56 intersecting all of the return flow passageways 42.

A short shallow groove or channel 60 is cut in the lower surface of the plate 30 and serves to connect the groove 56 with one of the displacement passageways 40, and thus with all of those passageways through the groove or channel 55.

This provision, serving to meter a small amount of damping fluid, provides orifice control of the rod displacement valve system during low velocity movements of the piston rod, as for example in the case of an automotive vehicle traversing a smooth boulevard.

In addition to the bleed opening afforded by the grooves 55, 56 and 60, it may also be explained that the provision of groove 55 permits the return valve disc 52 to seat quickly by providing a rapid escape into the holes 40 for the fluid trapped between the valve disc and the partition plate. Groove 56 of course serves a similar function.

The primary baffle member 50 corresponds in general function to the baffle 85 of the above mentioned co-pending application but is applied to the partition plate and so shaped as to attain notable advantages providing smoother damping, especially under high velocity operation. The novel baffle plate is shown very clearly in elemental form in FIGURES 3 and 4 of the drawings. The central portion 65 is somewhat depressed especially adjacent its marginal edges so as to afford a well-defined clamping of valving 47. Of course, the baffle is provided with a central opening which is designated 66, to receive the rivet 47. The upwardly relieved outer portion 68 of the baffle instead of being circular is cut away along the chordal lines 69 to form a generally triangular aspect as shown in FIGURE 3, the blunt apices 70 of the roughly triangular baffle being of arcuate configuration and having downwardly or inwardly directed arcuate flanges 72.

Cut within the upper or outer surface of the partition plate 30 radially outwardly of the outlet orifices 44 of the displacement passageways 40, and intersecting the inlet orifice recesses 45 of the return passageways 42, is the circular groove or channel 75.

The downturned flanges 72 of the baffle are received within this groove 75 and the apex portions 70 are disposed symmetrically with reference to the passageways 40 and cover the outlet orifices 44 which are controlled by the valving 47.

Contrariwise, the baffle 50 avoids the passageways 42 and exerts little or no obstruction to the flow of fluid in the vicinity of the inlet recesses 45 of the passageways 42 due ot the chordal clipping of the baffle 50 along the lines 69.

In operation, the valving and baffling will control the flow of damping fluid as shown in FIGURES 1 and 7. In FIGURE 1 the piston is assumed to be moving upwardly in the direction of the arrow A upon the compression stroke of the shock absorber, and the damping liquid displaced from the working chamber 27 by the progressive entrance of portions of the piston rod 22 is forced through the displacement passageways 40 in the partition plate 30. The outlet orifices 44 of the passageways 40 are controlled by the disc valving 47 which is seen to be flexed upwardly in FIGURE 1 to permit flow of fluid as indicated by the arrows $b$ out of the orifice 44 toward the reservoir or rod displacement chamber 25. The downturned flange 72 of the baffle and the area 68 baffles the flow of fluid, which must find egress around the flange 72 only when it comes to the cutaway chordal margin 69 of the baffle plate whence it emerges from the zone of the primary baffle 50 and proceeds through the openings in the secondary baffle 80.

This secondary baffle 80 is similar to the corresponding secondary baffle 70 shown in the above mentioned co-pending application and performs the same function.

The marginal flange 81 of this baffle is clamped by the shoulder 35 of the reservoir casing 12 against the chamfered edge of the flange 31 of the partition plate 30 and thus the baffle is held firmly in place. The baffle is provided with a circular series of hooded escape orifices 85 which give a circumferential whirl to the damping fluid as it is discharged into the displacement chamber or reservoir 25. By this time the liquid has lost substantially all of its jet velocity and the surface 26 of the liquid suffers a minimum of turbulence, and aeration is effectively prevented.

Particular attention is called to the emission of liquid past the edge 69 of the baffle 50 as indicated by the arrows c at the right-hand side of the baffle in FIGURE 1. In cases where the baffle was provided with a downturned flange at this point, the force of fluid ejected downwardly into inlet cavities 45 of the return passageways 42 would scoop fluid from within this cavity and interfere with the proper high-velocity operation of the device.

Referring now to FIGURE 7 of the drawings, it will be seen that upon return or rebound movement of the piston 20 the flow through the partition plate 30 is reversed. Valves 47 are closed to the flow of fluid through the passageways 40 and the fluid is drawn downwardly through the return passageways 42 against the slight resistance offered by the return disc valve 52.

The straight flow through the double baffling system and the return passageways 42 is graphically illustrated by the arrows d on the right-hand side of the rod displacement valve and baffle system of FIGURE 7. This direct flow unimpeded by any portion of the primary baffle 50 provdies minimum resistance to the return of fluid to the working chamber, and is responsible to a great degree for the attainment of the higher velocities without aeration.

Further advantages of the present provisions include the grouping of the return orifices more closely together and in a more pronounced 120° spacing. This improves the progressive cylindrical deflection of the return valve disc. The projection of the primary baffle flange 72 into the groove 75 prevents any quantity of fluid escaping beneath this flange. With this arrangement the inlet valve thicknesses can be varied without incurring leakage beneath the primary baffle flange or lip.

It will be understood that various changes may be made in the embodiment illustrated and described herein without departing from the scope of the invention as defined by the following claims.

Having thus described the invention, what is claimed as new and desired to be secured by Letters Patent is:

1. A double acting shock absorber of the telescoping piston-and-cylinder type, said shock absorber comprising a cylinder having a working chamber containing a damping liquid and a piston disposed for reciprocation in said liquid within the working chamber and having one end of a piston rod secured thereto, said rod extending through a packed opening in one end of said cylinder; a partition plate in said cylinder separating the working chamber from an adjacent piston-rod displacement liquid reservoir, an annular series of passageways passing through said plate for the flow to the reservoir of damping liquid displaced by increased penetration of the working chamber by the piston rod upon inward movement, and another annular series of passageways through said plate for the return flow of such liquid upon outward movement of said piston; at least one valve controlling the return flow through said last named passageways; said two series of passageways being offset radially from each other, valving adapted to control flow of the displaced damping liquid through the outlet orifices of the first named passageways; a baffle plate secured axially to the partition plate on said reservoir side thereof and spaced axially from said last named valving and having interrupted peripheral portions extending over and radially beyond the valve controlled outlet orifices of the first named or displacement flow passageways; intervening peripheral portions of said baffle plate being cut away to form relieved portions occurring adjacent the inlet orifices of the second named or return passageways.

2. The shock absorber as set forth in claim 1 in which there is disposed outwardly of said first named baffle plate a second baffle structure comprising a partition extending entirely across the cylinder and provided with an annular series of radially extending louvered slits for imparting a whirling action in one direction to displaced liquid which has already been diverted by the first baffle plate, and for accommodating return flow of the liquid in the opposite direction.

3. The shock absorber as set forth in claim 1 in which the surface of the partition plate on the reservoir side is provided with a peripheral groove of a diameter greater than the radial distance from the axis of the partition plate to the outermost margins of the outlet orifices of the fluid displacement passageways, flanges on the interrupted peripheral portions of said baffle plate entering portions of said groove adjacent and outwardly of said outlet orifices, the intervening relieved portions of the baffle plate being planar, whereby displaced liquid from the outlet orifices of the first series of passageways is prevented from flowing immediately radially outwardly from the orifice by said flange but must seek the relieved portions of the baffle plate for passage to the reservoir.

4. The shock absorber as set forth in claim 3 in which the relieved portions of said baffle plate terminate substantially radially inwardly of the inlet orifices of the return passageways so as to prevent any directing of flow of displaced liquid into said inlet orifices, and to provide a substantially clear direct flow into the return passageways upon outward movement of the piston.

5. The shock absorber as set forth in claim 1 in which a shallow circular groove is formed in the surface of the partition plate facing the working chamber, which groove intersects the inlet orifices of the first series of displacement flow passageways, a second concentric shallow circular groove is formed in said surface of the partition plate intersecting the outlet orifices of the return flow series of passageways, and a calibrated shallow radially extending cross groove is formed in said surface of the partition plate connecting the circular grooves to provide a permanent restricted bypass.

6. The shock absorber as set forth in claim 1 in which each of said series of passageways is arranged in three equally spaced groups of at least one passageway each, and the baffle plate is thus relieved along three chordal lines giving it the approximate shape of an equilateral triangle.

7. The shock absorber as set forth in claim 6 in which the first named series of passageways comprises three equally spaced single passageways and the second named series comprises three equally spaced groups of three passageways each.

8. The shock absorber as set forth in claim 7 in which each of the groups of three passageways has a common inlet cavity which occurs immediately radially outwardly of one of the relieved portions of said baffle plate.

9. A double acting shock absorber of the telescoping piston-and-cylinder type, said shock absorber comprising a cylinder having a working chamber containing a damping liquid and a piston disposed for reciprocation in said liquid within the working chamber and having one end of a piston rod secured thereto, said rod extending through a packed opening in one end of said cylinder; a partition plate in said cylinder separating the working chamber from an adjacent piston-rod displacement liquid reservoir, an annular series of passageways passing through said plate for the flow to the reservoir of damping liquid displaced by increased penetration of the working chamber by the piston rod upon inward movement, and another annular series of passageways through said plate for the return flow of such liquid upon outward movement of said piston; at least one valve controlling the return flow through said last named passageways; said two series of passageways being offset radially from each other, disc valving secured axially to the partition plate upon the reservoir side thereof and adapted to control flow of the displaced damping liquid through the outlet orifices of the first named passageways; the inlet orifices of the return passageways occurring for the greater portion thereof radially outwardly of the periphery of said disc valving; a baffle plate secured axially to the partition plate on said reservoir side thereof and spaced axially from said last named disc valving and having interrupted peripheral portions extending over and radially beyond the disc valve controlled outlet orifices of the first named or displacement flow passageways; intervening peripheral portions of said baffle plate being cut away to form relieved portions occurring adjacent the inlet orifices of the second named or return passageways.

No references cited.